United States Patent [19]

Almond, Jr.

[11] 4,264,411

[45] Apr. 28, 1981

[54] EVAPORATOR ENTRAINMENT SEPARATOR

[75] Inventor: Charles B. Almond, Jr., Birmingham, Ala.

[73] Assignee: Envirotech Corporation, Menlo Park, Calif.

[21] Appl. No.: 75,362

[22] Filed: Sep. 13, 1979

[51] Int. Cl.³ ............................................ B01D 1/00
[52] U.S. Cl. .............................. 159/1 R; 159/27 A; 202/197; 203/40; 55/440
[58] Field of Search ................ 55/440; 122/488–492; 202/197, 198, 200; 203/40; 159/1, 27 A

[56] References Cited

U.S. PATENT DOCUMENTS

| | | | |
|---|---|---|---|
| 1,168,758 | 1/1916 | Stade | 159/27 F |
| 2,143,191 | 1/1939 | Fletcher et al. | 55/440 |
| 3,070,937 | 1/1963 | Bub | 55/387 |
| 3,338,035 | 8/1967 | Dinkelocher | 55/440 |
| 3,527,030 | 9/1970 | Hungate | 55/440 |
| 3,614,858 | 10/1971 | Pohjolainen | 55/455 |
| 4,068,627 | 1/1978 | Giesecke | 122/34 |

FOREIGN PATENT DOCUMENTS

| | | | |
|---|---|---|---|
| 72839 | 12/1916 | Austria | 55/440 |
| 23691 | of 1903 | United Kingdom | 55/440 |
| 484823 | 5/1938 | United Kingdom | 122/492 |
| 382422 | 3/1971 | U.S.S.R. | 55/440 |
| 497034 | 3/1976 | U.S.S.R. | 55/440 |
| 546363 | 3/1977 | U.S.S.R. | 55/440 |

OTHER PUBLICATIONS

Chilton—Elimination of Carryover from Packed Towers with Special Refr. to Natural Draught Water Cooling Towers in T.I.Ch.E, vol. 30 (1952) pp. 235-251.

Primary Examiner—Bernard Nozick
Attorney, Agent, or Firm—Robert E. Krebs; Thomas J. McNaughton; Thomas S. MacDonald

[57] ABSTRACT

A separator assembly (30) for an evaporator comprises an ensemble of spaced-apart corrugated vanes (31) mounted in a hollow cylindrical configuration at the outlet (22) of the evaporator. The spacing between adjacent vanes (31) is such as to prevent line-of-sight passage of vapor between adjacent vanes (31) from the outer wall (33) to the inner wall (34) of the ensemble. The upper end of the ensemble of vanes (31) is secured to an annular support member (32), which is secured to the evaporator circumjacent the outlet (22). A closure member (40) is secured to the lower end of the ensemble. The annular support member (32) and the closure member (40) prevent vapor from leaving the evaporator via any path other than tortuous path between adjacent vanes (31) in a direction from the outer wall (33) to the inner wall (34). Droplets entrained in the vapor passing through the separator assembly (30) impinge upon the vanes (31) and are thereby separated from the vapor.

8 Claims, 4 Drawing Figures

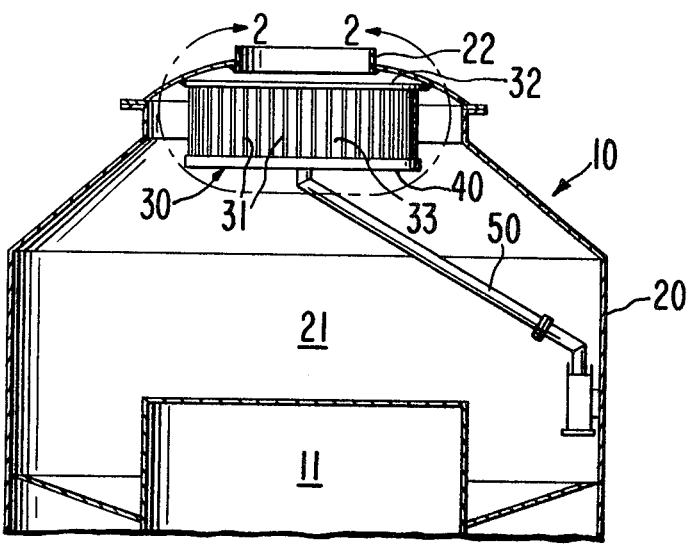
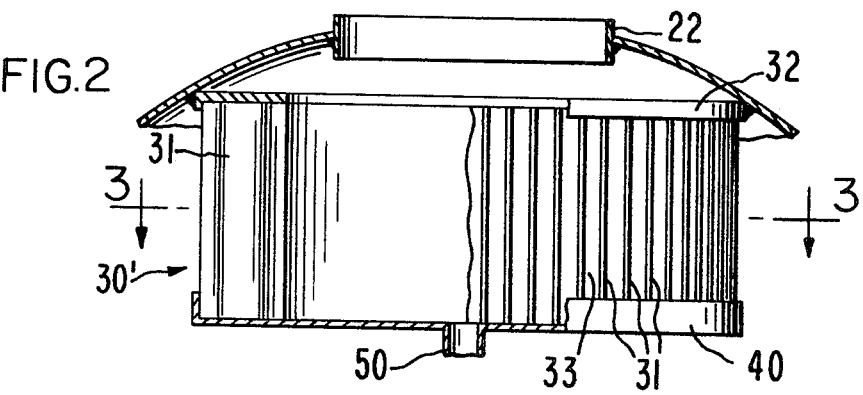
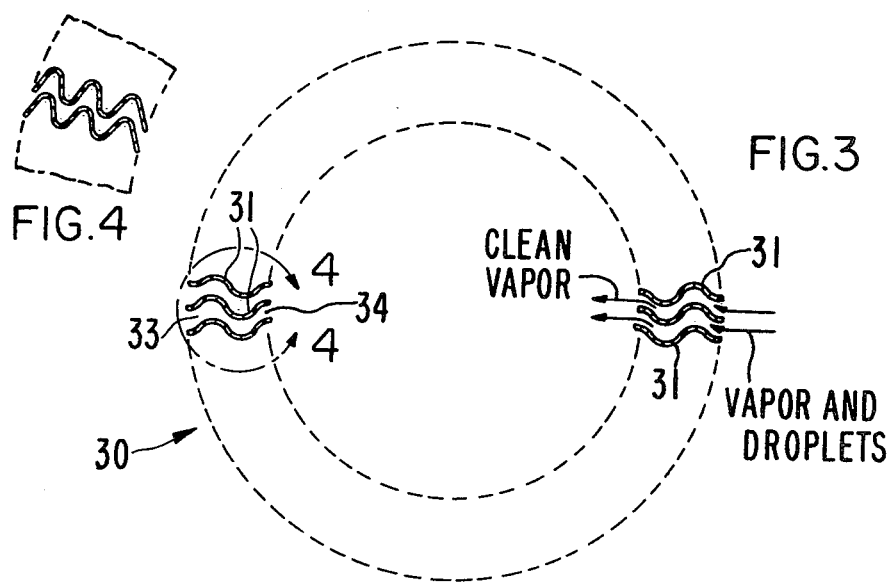

EVAPORATOR ENTRAINMENT SEPARATOR

BACKGROUND OF THE INVENTION

1. Field of the Invention

This invention relates generally to evaporator apparatus, and is concerned with eliminating entrained droplets of liquid from vapor generated in an evaporator.

2. State of the Art

Evaporators are used in various industrial applications (e.g., sugar processing, paper manufacturing, chemical production and mineral extraction) to recover valuable constituents in waste liquors by removing water in the form of vapor from the liquors. Industrial evaporators typically include separator devices for eliminating liquid droplets that become entrained in the vapor generated by the evaporation process.

A discussion of various louver-type droplet separators can be found in an article by H. Chilton entitled "*Elimination of Carryover From Packed Towers With Special Reference To Natural Draught Water Cooling Towers*," published in *Transactions of the Institution of Chemical Engineers*, Volume 30, (1952), pages 235-251. Droplet separators are also described the in U.S. patent literature, e.g., in U.S. Pat. Nos. 3,070,937; 3,338,035; and 3,527,030.

In practice, vanes used in the prior art as droplet separators for industrial evaporators have been arranged in ensembles of generally rectangular configuration, because separator manufacturers have utilized vane ensembles of the kind designed primarily for mounting in rectangularly configured orifices of air flow ducts of air conditioning systems. In the prior art, the spacing between adjacent vanes has generally been constant along the vapor flow path in droplet separators for industrial evaporators.

OBJECTS AND FEATURES OF THE INVENTION

It is an object of the present invention to provide an evaporator having an improved means for separating entrained liquid droplets from vapor generated in the evaporator.

A feature of an evaporator according to the present invention is that the droplet separating means comprises a plurality of spaced-apart corrugated vanes arranged to form a hollow ensemble, which is mounted at the outlet of the evaporator in such a way that vapor leaving the evaporator must pass along a tortuous path between adjacent vanes in a direction from the outer wall to the inner wall of the hollow vane ensemble. The spacing between adjacent vanes of the ensemble is such that droplets entrained in the vapor necessarily impinge upon the vanes, and thereby become separated from the vapor as the vapor leaves the evaporator.

It is a further object of the present invention to provide an improved separator for mounting at the vapor outlet of an evaporator in order to eliminate entrained liquid droplets from vapor generated in the evaporator.

A feature of the droplet separator according to the present invention is that a plurality of spaced-apart corrugated vanes is arranged to form a hollow ensemble for mounting at the outlet of an evaporator, where the spacing between adjacent vanes is such as to prevent line-of-sight passage of vapor through the separator in the direction from the outer wall to the inner wall of the vane ensemble. In this way, droplets of liquid entrained in the vapor must impinge upon the vanes of the separator as the vapor leaves the evaporator.

A particular advantage of the present invention is that a droplet separator according to the principles of this invention can be fabricated using vanes that are commercially available at the present time for use as scrubbers and mist eliminators in air flow devices such as air conditioning equipment.

Other features and advantages of the present invention will become apparent upon perusal of the description of the preferred embodiment in conjunction with the accompanying drawing.

DESCRIPTION OF THE DRAWING

FIG. 1 is a cross-sectional view of a vapor dome and upper portion of a tube trunk of an evaporator according to the present invention.

FIG. 2 is an enlarged cross-sectional view of a droplet separator mounted at the outlet of the vapor dome of an evaporator according to the present invention, as shown within line 2—2 of FIG. 1.

FIG. 3 is a plan view of the droplet separator taken along line 3—3 of FIG. 2.

FIG. 4 is a fragmentary plan view of an alternative configuration for the vanes of a droplet separator as shown within line 4—4 of FIG. 3.

DESCRIPTION OF PREFERRED EMBODIMENT

As shown in FIG. 1, a vapor dome 10 is mounted atop and in vapor communication with a tube trunk 11 of a long-tube vertical evaporator. A large number, typically hundreds or even thousands, of vertically rising tubes may be housed within the tube trunk 11. The vapor dome 10 comprises a housing 20, which defines an expansion region 21 in which droplet-laden vapor generated in the vertically rising tubes can be expanded and collected. The housing 20 is of generally cylindrical configuration in the preferred embodiment, although the configuration of the housing is not material to the invention.

For a long-tube vertical evaporator of conventional design, the bottom ends (not shown) of the tubes in the tube trunk 11 are immersed in a pool of waste liquor that is fed into a liquor box at the bottom of the trunk 11, and the top ends of the tubes extend into the vapor expansion region 21. The tubes in the trunk 11 are externally heated, as by exposure to steam, in order to draw boiling liquid up into the tubes from the liquor box at the bottom of the trunk 11. In a typical long-tube vertical evaporator, the tubes may be in the range from 20 to 28 feet in length and have a diameter from $1\frac{1}{2}$ to 2 inches. The heat transfer area of the tubes of a typical installation might be as high as 40,000 square feet.

In operation, liquid rising in the tubes (collectively referred to as the tube bundle) boils at an ever-increasing rate as the liquid rises. The resulting vapor, which tends to be laden with droplets of liquid, is discharged at a high velocity into the vapor expansion region 21 of the vapor dome 10. The tube bundle and the liquor box may be of conventional design, and hence are not shown in the drawing.

As shown in FIG. 1, and in enlarged view of FIG. 2, an outlet 22 is provided at the top of the housing 20 to permit exit of vapor from the expansion region 21 of the evaporator. Mounted at the outlet 22 is a separator assembly 30 comprising a plurality of spaced-apart corrugated vanes 31, which are secured to a generally annular support member 32 and arranged to form a hollow ensemble of vanes. In the preferred embodiment, the outlet 22 is circular and the ensemble of vanes 31 is of right circular cylindrical configuration. However, in applications where a non-circular outlet 22 would be advantageous, the ensemble of vanes 31 could correspondingly be cylindrical but of a configuration other than right circular.

Referring to the preferred embodiment shown in the drawing, the vanes 31 are secured to the annular support member 32 to form a hollow right circular cylindrical ensemble, with the individual vanes 31 being in generally radial disposition with respect to the cylindrical axis of the ensemble. The annular support member 32 is secured to the inside wall of the housing 20 at a location circumjacent the outlet 22, thereby providing a mounting for the separator assembly 30 at the outlet 22 such that the assembly 30 extends downward into the expansion region 21. Attachment of the individual vanes 31 to the support member 32, and attachment of the support member 32 to the housing 20, may be accomplished by conventional means (e.g., by welding).

As shown in plan view in FIG. 3, the hollow cylindrical ensemble of vanes 31 of the separator assembly 30 has an outer wall 33 and an inner wall 34, with the contour of the outer wall 33 being defined by the radially outward ends of the vanes 31 and the contour of the inner wall 34 being defined by the radially inward ends of the vanes 31.

The non-apertured portion of the support member 32 covers the upper end of the ensemble of vanes 31, with the hollow interior of the ensemble being aligned with the aperture of the support member 32. Preferably, the aperture of the support member 32 has approximately the same diameter as the hollow interior of the ensemble of vanes 31. The separator assembly 30 also includes a closure member 40, which is attached to the lower end of each of the vanes 31 to cover the lower end of the ensemble. The support member 32 at the top of the vane ensemble and the closure member 40 at the bottom of the vane ensemble prevent vapor from leaving the expansion region 21 via any path other than between adjacent vanes 31 in a direction from the outer wall 33 to the inner wall 34 leading into the interior of the hollow separator assembly 30.

It is not necessary that the ensemble of vanes 31 be precisely cylindrical. In particular applications it might be advantageous for one or more of the vanes 31 to be dimensioned differently from the other vanes, so that the hollow ensemble could assume a bulge or indentation on its outer wall 33 and/or inner wall 34 and thus acquire an overall non-cylindrical aspect. In certain applications, it might be advantageous for either the outer wall 33 or the inner wall 34, or both the outer and inner walls, of the ensemble of vanes 31 to assume a truncated conical configuration. In such applications, however, the vane ensemble would nevertheless be mounted at the outlet 22 in such a way that vapor could exit from the expansion region 21 only by passing between adjacent vanes 31 in a direction from the outer wall 33 to the inner wall 34.

Each vane 31 is corrugated in a direction parallel to the cylindrical axis of the ensemble. Corrugated vanes that are commercially available for use as scrubbers and mist eliminators in air conditioning systems are quite suitable for fabricating the droplet separator assembly 30 of the present invention. The spacing between adjacent vanes 31 is such as to preclude line-of-sight passage of vapor between adjacent vanes, so that any droplets entrained in vapor passing between adjacent vanes 31 must necessarily impinge upon one of the vanes as the vapor passes through the separator assembly 30.

In the preferred embodiment, the distance separating adjacent vanes 31 along any radius between the outer wall 33 and the inner wall 34 is substantially the same for any two adjacent vanes of the ensemble. The corrugation of the vanes 31 could advantageously be sinusoidal with constant pitch and amplitude, although vanes providing a radially changing pitch and/or amplitude could be used provided that line-of-sight passage of vapor between adjacent vanes is precluded.

Each vane 31 as shown in FIG. 3 has curved segments lying between alternating ridges of maximum and minimum amplitude so as to assume an overall sinusoidal configuration. It is not necessary to the invention, however, that the corrugated vanes 31 have a sinusoidal configuration. The vanes 31 could instead be chevron-shaped, as shown in FIG. 4, and still be within the scope of the invention. Each vane in the embodiment shown in FIG. 4 has a series of flat segments, with any two adjacent flat segments meeting in a somewhat rounded crease. The creases at the junctions of adjacent flat segments need not be rounded, however, but could be quite sharp.

With the right circular cylindrical disposition of the vanes 31 of the preferred embodiment as shown in the drawing, the spacing between adjacent vanes decreases in the radially inward direction from the outer wall 33 to the inner wall 34. Consequently, according to Bernoulli's principle, the velocity of vapor passing through the separator assembly 30 increases in the direction from the outer wall 33 to the inner wall 34. This increase in vapor flow velocity through the separator assembly 30 has been found to enhance the efficiency with which droplets that impinge upon the vanes 31 are separated from the vapor, provided that the vapor flow velocity is not so great that the fast-flowing vapor can shear de-entrained liquid from the surfaces of the vanes 31 and thereby re-entrain the liquid as droplets in the vapor.

For a right circular cylindrical separator assembly 30, the difference between the vapor velocity at the inner wall 34 and the vapor velocity at the outer wall 33 is determined by the ratio of the outer diameter to the inner diameter of the vane ensemble. Thus, the increase in velocity for vapor passing through the separator assembly 30 can be controlled by appropriate selection of the inner and outer radial lengths of the vanes 31 in order to prevent the occurrence of such shearing of the liquid from the surfaces of the vanes.

Liquid depositing upon the surfaces of the vanes 31 as the result of the impingement of droplets thereon runs downward along the vanes 31 and collects on the underlying cover member 40. As shown in the drawing, the cover member 40 is horizontal. However, in particular applications the cover member 40 could be sloped to facilitate the concentration of liquid collected thereon. A drain 50 may advantageously be provided in communication with the cover member 40 to remove the collected liquid to the exterior of the housing 20.

This invention has been described above in terms of specific structural details which are to be construed as illustrative rather than limiting. It should be recognized that various changes and modifications in the design of the preferred embodiment could be made by workers skilled in the art in order to facilitate adaption of this invention to particular applications without departing from the fundamental teachings of this invention. The scope of the invention is defined by the following claims and their equivalents.

What is claimed is:

1. An evaporator comprising:
   (a) means for generating a vapor in which liquid droplets may be entrained;
   (b) a vapor dome supported above said vapor generating means to collect said vapor and said entrained liquid droplets, said vapor dome defining an outlet through which vapor passes in leaving said evaporator; and
   (c) a stationary droplet separator means mounted inside said vapor dome, said droplet separator means including:
      (i) an annular support member secured to said vapor dome, said support member defining a central aperture that is aligned and in gas-flow communication with said outlet of said vapor dome;
      (ii) a plurality of corrugated vanes, each vane having a top edge, a bottom edge, an inner edge and an outer edge; the top edge of each of said vanes being secured to said support member, said vanes being arranged spaced apart from each other to form a vane ensemble having a hollow right circular cylindrical configuration, an outer cylindrical wall of said vane ensemble being defined by the outer edges of said vanes and an inner cylindrical wall of said vane ensemble being defined by the inner edges of said vanes, said inner cylindrical wall being aligned coaxially with said aperture of said annular support member; the spacing between adjacent vanes of said vane ensemble being such as to prevent line-of-sight passage of vapor between adjacent vanes in a direction from said outer wall to said inner wall, said spacing between adjacent vanes decreasing radially inward from said outer wall to said inner wall, the horizontal centerlines of said corrugations in said vanes are straight and are on radii of the axis of said cylindrical ensemble; and
      (iii) an imperforate closure member, the bottom edge of each of said vanes being secured to said closure member, said closure member thereby forming a closed bottom for said droplet separator;
      (iv) liquid drainage means mounted in central communication through said imperforate closure member to remove liquid collected by said vane ensemble from said evaporator; said closure member and said annular support member preventing vapor from leaving said evaporator except via a tortuous path between adjacent vanes in a direction from said outer wall to said inner wall of said vane ensemble,
   whereby liquid droplets entrained in said vapor impinge on said vanes and thereupon run downward on said vanes to said closure member, and the collected liquid is discharged from said closure member via said liquid discharge means, and relatively liquid-free gases pass through said aperture in annular support member to discharge via said outlet of said vapor dome.

2. The separator of claim 1 wherein said vanes are of chevron-shaped configuration.

3. The separator of claim 1 wherein said vanes are of sinusoidal configuration.

4. The separator of claim 3 wherein said sinusoidally configured vanes have substantially constant pitch and amplitude.

5. The evaporator of claim 1 wherein the spacing between adjacent vanes along said outer wall is substantially the same for any two adjacent vanes.

6. The evaporator of claim 5 wherein the spacing between adjacent vanes along said inner wall is substantially the same for any two adjacent vanes.

7. The evaporator of claim 6 wherein the spacing between adjacent vanes along any radius between said outer wall and said inner wall is substantially the same for any two adjacent vanes.

8. The evaporator of claim 7 wherein said vanes are of substantially identical configuration.

* * * * *